No. 722,045. PATENTED MAR. 3, 1903.
F. C. REAM.
COMPUTING MEASURE.
APPLICATION FILED SEPT. 11, 1902.
NO MODEL.
2 SHEETS—SHEET 1.
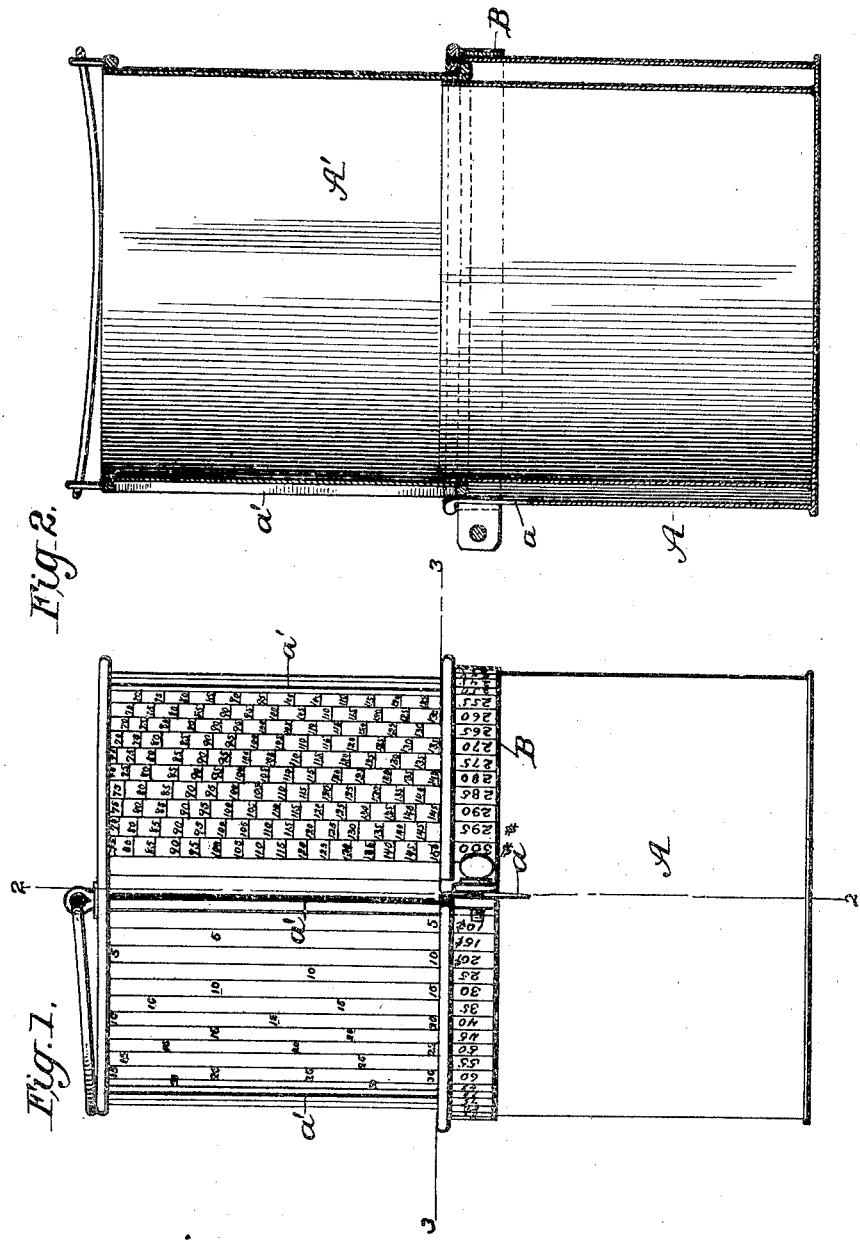
WITNESSES:
Jos. A. Ryan
Edw. W. Byrn
INVENTOR
Frank C. Ream.
BY Munn & Co.
ATTORNEYS.

No. 722,045. PATENTED MAR. 3, 1903.
F. C. REAM.
COMPUTING MEASURE.
APPLICATION FILED SEPT. 11, 1902.
NO MODEL. 2 SHEETS—SHEET 2.
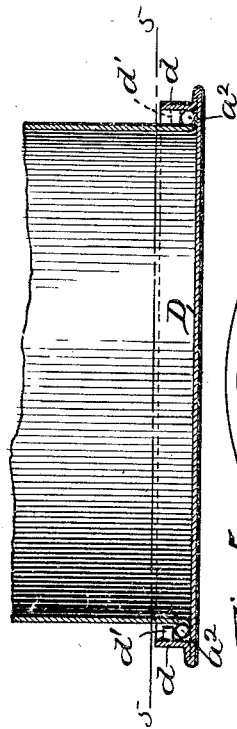
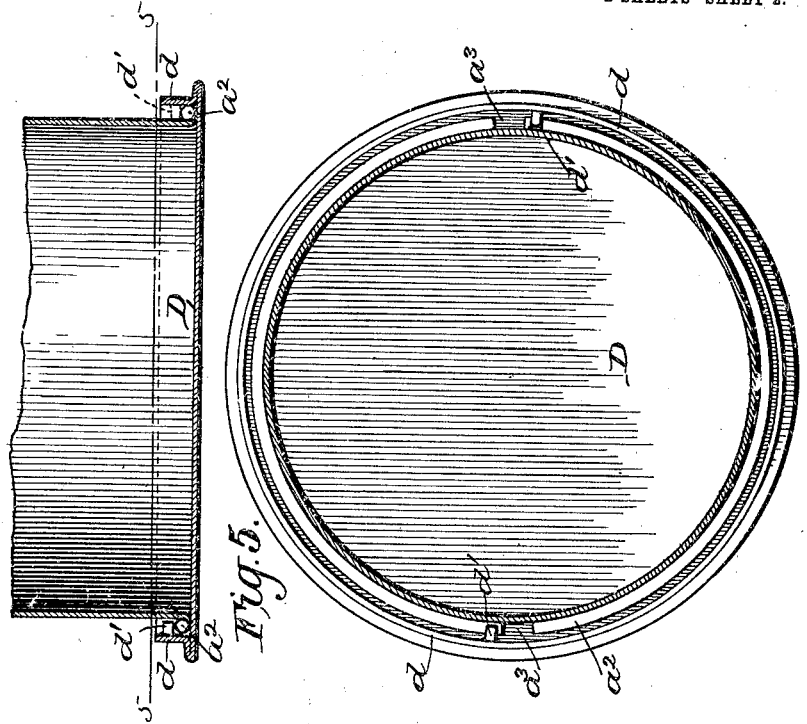
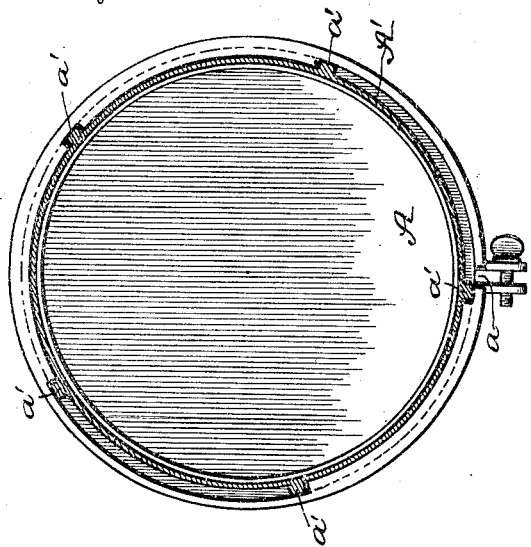
WITNESSES:
Jas. A. Ryan
Edw. M. Byrn.
INVENTOR
Frank C. Ream
BY Munn & Co.
ATTORNEYS.

UNITED STATES PATENT OFFICE.

FRANK C. REAM, OF BUTLER, MISSOURI.

COMPUTING-MEASURE.

SPECIFICATION forming part of Letters Patent No. 722,045, dated March 3, 1903.

Application filed September 11, 1902. Serial No. 122,966. (No model.)

*To all whom it may concern:*

Be it known that I, FRANK C. REAM, of Butler, in the county of Bates and State of Missouri, have invented a new and useful Improvement in Computing-Measures, of which the following is a specification.

My invention relates to that class of dry measures which are made in two telescopically-sliding sections which may be drawn out to a maximum capacity or be forced together to reduce the volume to a fractional part of the maximum volume.

It consists in a simple and practical device of this kind in which a varying-price scale of the unit of measurement is combined with the two telescopic sections and a varying-volume scale on one of the sections adjusted to the different prices of fractions of the unit, so that any uneducated clerk may quickly and accurately measure out any fractional part of a commodity at a definite price without computing, the measure itself being a computing-measure to determine the desired quantity at a definite price, as will be hereinafter fully described with reference to the drawings, in which—

Figure 1 is a side elevation of a half-bushel measure with the measure drawn out to its maximum capacity. Fig. 2 is a vertical section; Fig. 3, a cross-section on line 3 3 of Fig. 1; Fig. 4, a detail of the removable bottom of small-sized measures, for the purpose hereinafter described; and Fig. 5 is a cross-section on line 5 5 of Fig. 4.

In the drawings, A A' represent the two telescopic sections of the measure, which, as shown, are made cylindrical, which is the preferred form. These two sections when drawn out to their greatest capacity, as shown in Fig. 1, represent any definite unit of measure, such as a half-bushel, a peck, a gallon, or even smaller units. The lower section A is made double, with an inner and outer wall, leaving between them an annular space, into which slides telescopically the upper section A', which preferably has a handle or bail at the top. To guide the two sections in their sliding adjustment, the upper section has any desired number of vertical ribs $a'$, which slide in corresponding grooves or notches formed in the inner wall of the lower section. These guide-ribs may work with a sliding friction, but are preferably provided with ball-bearings to reduce friction in the well-known way.

Around the upper edge of the lower section A there is clamped a ring B. This ring does double duty as a scale and a clamp. In the first place it bears a varying-price scale marked around its entire periphery, indicating the varying price per unit of measurement. In the measure illustrated, whose unit is bushels, the price-scale runs from ten cents to three dollars, increasing by five. It may, however, run to any amount. Immediately above these markings of the varying-price scale there is laid off in vertical columns extending over the whole surface of the upper section a series of markings of fractional parts of this price-scale in differences of five cents and when a definite quantity of a commodity is wanted at a definite price the upper section A' is forced down until price of the quantity wanted comes to the level of the top of the lower section A and the measure will then be reduced in capacity, so as to measure the quantity wanted at the price indicated. Thus (remembering that the measure shown is a half-bushel or half-unit when fully extended) if fifteen cents' worth of oats is wanted at thirty cents a bushel the measure stands at its full extension and the number "15" of the upper section will be at the upper edge of the lower section immediately above "30" cents on the ring-scale, which indicates that fifteen cents buys a half a bushel or the full extension of the measure. This simple illustration, which really needs no computation, is only given to show how for units of bushels the figures on the half-bushel measure must be adjusted to the half quantity of that unit, which the fully-extended measure calls for in half-bushels. If the unit of measurement were a peck, a gallon, or other whole quantity instead of a half-bushel, this adjustment would not be necessary—that is to say, if the measure were to hold a peck when fully extended for a half-peck one telescopic section would shut entirely down into the other.

I will now give an illustration which ordinarily would require computation. Suppose eighty-five cents' worth of grass-seed were wanted at three dollars a bushel. The clerk looks for the unit-price "$3.00" on the scale-ring, and then, looking up the column of figures immediately above this price until he finds "85," he then forces down the upper section A' into the lower section A until the figure "85" reaches the top of the lower section of the measure. The measure then will just hold eighty-five cents' worth of seed at three dollars a bushel.

I will now describe the other function of the ring B. In addition to bearing the varying price per unit of measurement the ring acts as a clamp to bind the two sections of the measure together and hold them fixedly to any definite-quantity measurement to which they may be adjusted. For this purpose the top edge of the lower section A is split vertical at $a$ for a short distance and the two ends of the ring are turned outwardly and provided with some means for bringing them together to cause the ring to pinch the split edges of the lower section against the top section, and thus hold them rigidly together. As shown, a set-screw may be used for this; but I prefer a quick-acting thumb-piece, various forms of which may be used.

When the unit of measure is small—such as a gallon, peck, gallon, quart, or pint—it is desirable to have the measure so constructed as to permit its measured contents to be quickly transferred without spilling to a paper bag, and for this purpose the bottom of such small measures is made removable and when removed the measure is simply adjusted to quantity and then set in the paper bag. The commodity is then poured into the measure until it is filled and the measure then withdrawn from the bag, leaving the measured quantity of merchandise in the bag. Such detachable bottom is shown in Figs. 4 and 5, in which the bottom D is formed with a standing flange $d$ and inwardly-projecting pins $d'$, which are adapted to pass through openings $a^3$ in an outturned flange $a^2$, formed on the lower edge of the bottom section. This removable bottom is locked in place by passing the pins $d'$ through the openings $a^3$ and then giving a rotary turn to the bottom, which causes the pins to pass above the flange of the bottom section A, forming a sort of bayonet-joint. The construction and arrangement of this removable bottom are specially related to the use of the computing-measure just described. It will be understood that there must be no inwardly-projecting parts at the bottom of the measure, as this would catch against the material when the measure is withdrawn from the bag and make such withdrawal difficult if not impossible. For this reason the flange $a^2$ on the lower edge of the lower section is turned outwardly, and the removable bottom D, I make sufficiently large that its standing flange $d$ will fit outside the flange $a^2$, so that the inwardly-projecting pins $d'$ will extend over the flange $a^2$ when turned to lock. The pins $d'$ are also by this arrangement housed and protected, so that they are not liable to catch into anything nor be bent from external blows.

As shown, the volume-scale is on the upper section and the price-scale on the lower section; but it is to be understood that these positions may be reversed without altering my invention.

Having thus described my invention, what I claim as new, and desire to secure by Letters Patent, is—

1. A computing-measure comprising two telescopically-sliding sections, one of which has a price-per-unit scale of figures extending progressively around its periphery, and the other of which has vertical columns of figures extended in alinement above the figures of the price-per-unit scale, indicating fractions of the units, to determine the telescopic adjustment of the sliding sections as described.

2. A computing-measure comprising two telescopically-sliding sections, one of which has a price-per-unit scale of figures extending progressively around its periphery, and the other of which has vertical columns of figures extended in alinement above the figures of the price-per-unit scale, indicating fractions of the units, to determine the telescopic adjustment of the sliding section, and means for locking the two sections to their adjustment as described.

3. A measure having two cylindrical and telescopically-sliding sections, one of which has a split edge and an encompassing clamping-band surrounding the latter and bearing a price-per-unit scale and adapted to pinch and fix the latter in its relation to the other section and said other section having vertical columns of figures indicating price-fractions of the units as described.

4. A measure having two telescopic sections with parallel longitudinally-arranged guide-ribs, a price-per-unit scale on one section and a fractional scale on the other section substantially as described.

5. A measure comprising two cylindrical and telescopic sections, and a locking-ring encompassing one of said sections and locking it to the other section, said ring having also marked on the same a progressive price-per-unit scale extending around the locking-ring as described.

6. A measure comprising two cylindrical telescoping sliding sections bearing scales as described, and a removable bottom applied externally to the lower section, said lower section having at its lower edge an outturned flange with openings in it, and the removable bottom being made with a standing flange of larger diameter than the outturned flange of the lower section of the measure and having inwardly-pointing pins adapted to pass through the openings in the said outturned flange and to lock over the same in a housed and protected relation substantially as described.

7. A measure comprising two cylindrical and telescopic sections bearing scales as described one of said sections being made with double walls to receive the other, and vertical parallel guides arranged between the two sections as described.

FRANK C. REAM.

Witnesses:
J. K. NORFLEET,
D. L. EDRINGTON.